US006920845B2

United States Patent
Lelkes et al.

(10) Patent No.: US 6,920,845 B2
(45) Date of Patent: Jul. 26, 2005

(54) ENGINE COOLING DISC VALVE (75) Inventors: Mark Lelkes, Budapest (HU); Peter Lengyel, Örkény (HU); Zheng Lou, Plymouth, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 149 days.

(21) Appl. No.: 10/641,865

(22) Filed: Aug. 14, 2003

(65) Prior Publication Data
US 2005/0034688 A1 Feb. 17, 2005

(51) Int. Cl.⁷ .................................. F01P 9/00; F01P 7/14
(52) U.S. Cl. ............................ 123/41.01; 123/41.06; 123/41.08; 123/41.4
(58) Field of Search ........................ 123/41.01, 41.02, 123/41.04, 41.06, 41.08, 41.4

(56) References Cited

U.S. PATENT DOCUMENTS

| 3,124,162 A |   | 3/1964  | Cameron |
|---|---|---|---|
| 3,889,878 A |   | 6/1975  | Evans |
| 5,110,045 A | * | 5/1992  | Glasson et al. ............ 236/93 R |
| 5,337,705 A |   | 8/1994  | Lane |
| 5,529,026 A |   | 6/1996  | Kurr et al. |
| 5,617,815 A |   | 4/1997  | Spies et al. |
| 5,950,576 A |   | 9/1999  | Busato et al. |
| 5,967,185 A |   | 10/1999 | Baruschke et al. |
| 6,164,248 A | * | 12/2000 | Lehmann ................... 123/41.1 |
| 6,289,913 B1 | * | 9/2001 | Babin ...................... 137/15.18 |
| 6,371,060 B1 |  | 4/2002  | Lehmann et al. |
| 6,539,899 B1 |  | 4/2003  | Piccirilli et al. |
| 2001/0042525 A1 | * | 11/2001 | Lehmann ................... 123/41.1 |
| 2002/0047050 A1 |  | 4/2002  | Leu et al. |

FOREIGN PATENT DOCUMENTS

| DE | 28568      | 3/1987 |
| DE | 19834575   | 2/2000 |
| EP | 0246359    | 5/1990 |
| FR | 2672639 A  | 5/2002 |
| GB | 1399244    | 6/1975 |
| JP | 2001056869 | 9/2002 |

OTHER PUBLICATIONS

Forissier, From Passive to Active Engine Cooling, pp. 68–70, AutoTechnology, 2001, No. 6.

* cited by examiner

Primary Examiner—Thomas Moulis
(74) Attorney, Agent, or Firm—MacMillan, Sobanski & Todd, LLC (57) ABSTRACT

A multi-port rotary valve used to distribute coolant to an engine cooling system comprises a valve body having a plurality of outlet ports for directing coolant flow to a radiator circuit, a heater circuit, and an auxiliary circuit. An internal gear driven rotary disc includes a gear driven mechanism located on an inner circumference of the rotary disc. The rotary disc includes two apertures positioned on a top surface of the rotary disc for regulating predetermined flow paths and flow rates to the plurality of ports. An inlet housing body which includes an inlet port mates with the valve body and encases the rotary disc. An actuator which is coupled to a drive gear mounted internal to the inlet housing body is responsive to a control signal for transmitting a torque to the internal drive gear for rotating the rotary disc to regulate coolant flow.

25 Claims, 5 Drawing Sheets

ENGINE COOLING DISC VALVE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to automotive engine cooling systems, and, more specifically, to a multi-port valve for distributing and controlling coolant flow to cooling system circuits.

2. Description of the Related Art

Conventional cooling systems for internal combustion engines include a coolant circuit within an engine block, a radiator, a fan, a heater core, water pump, and various hoses and clamps. They also include a thermostat and/or various valves to control the flow of coolant in response to the temperature of the coolant, demand for heating of the passenger compartment, and other factors.

When an engine is first warming up after being started, it is known to have the coolant flow bypass the radiator so that the coolant and the engine warm up more quickly. Quicker warming leads to reduced engine emissions, improved fuel economy, and improved engine performance since reaching an optimal engine operating temperature in faster time means less time spent in cold start emissions mitigation strategies. Vehicles using diesel systems may use an oil-cooler circuit in place of the bypass circuit.

The switching of coolant flow between a bypass circuit and the radiator circuit is conventionally performed by a thermostat. A typical thermostat uses a wax motor to drive a valve between one position in which all coolant is directed through the bypass and none to the radiator and another position in which all coolant is directed through radiator and not through the bypass. Some thermostats may gradually cut off bypass flow while radiator flow gradually increases.

Internal combustion engine technology is producing engines of higher efficiency and increasingly sophisticated control methods. This has increased the need for fast warm up times and precise control of engine operating temperatures, which have not been adequately attained with conventional cooling systems. Furthermore, delays in warming up of the engine also delay the availability of heat in the passenger compartment.

A passive 2-way valve separate from the thermostat has been used to direct coolant to a heater core when warm air is being demanded in the passenger compartment. Other valves may also be included for either cooling or heating other vehicle components, such as cooling of electronic modules or heating of seats. Achieving these additional functions becomes expensive not only because of the proliferation of valves, but also because of the proliferation of separate actuators and wiring, cables, or hydraulic or pneumatic (e.g. vacuum) lines required to control them.

Multi-port rotary valves have generally been known for regulating more than 2 valve ports. U.S. Pat. No. 5,529,026 discloses a single-point coolant diversion to various ports of an engine cooling system. However, this and other multi-port valves that utilize an actuator to drive a rotary valve have required an external mounted actuator with an external gearing or coupling to drive the rotary valve. This requires additional packaging space exterior to the valve body. Also, should an actuator be used to drive the valve, if an actuator failure or loss of control signal occurs, the valve must be returned to a default position so that the proper coolant flow can be maintained to cool the system. This often requires the use of a clutch located interior or exterior to the actuator to release the gearing from a drive unit. The addition of the clutch either interior or exterior to the actuator adds more components, which adds to the expense, and requires additional packaging space.

Furthermore, a majority of the multi-port rotary valves incorporate a coolant flow inlet port offset (not coaxial) from a radiator port. Those multi-port rotary valves that do have the inlet port and the radiator port co-axial incorporate the default position at a distal end of the rotary valve rotation.

SUMMARY OF THE INVENTION

The present invention provides a multi-port rotary valve that uses a rotary gear driven disc having a gear driven mechanism on its inner circumference in direct contact with an internal drive gear coupled to an actuator to direct coolant to a plurality of cooling circuits. A spring mechanism is used to return the rotary disc to a failsafe position located at a rotational midpoint on the rotary disc when the actuator is unresponsive to a control signal.

In one aspect of the invention, a multi-port rotary valve used to distribute coolant to an engine cooling system comprises a valve body having a plurality of outlet ports which includes a radiator port for directing coolant flow to a radiator circuit, a heater port for directing coolant flow to a heater circuit, and an auxiliary port for directing coolant flow to an auxiliary circuit. The plurality of ports is located on a top surface of the valve body. An internal gear driven rotary disc includes a gear driven mechanism located on an inner circumference of the rotary disc. The rotary disc includes at least two apertures positioned on a top surface of the rotary disc for regulating predetermined flow paths and flow rates to the plurality of ports. A first aperture regulates jointly the radiator port and the heater port and a second aperture regulates the auxiliary port. An actuator is responsive to a control signal for rotating the rotary disc to regulate coolant flow to the plurality of ports. An inlet housing body which includes an inlet port mates with the valve body and encases the rotary disc. A drive gear mounted internal to the inlet housing body resides in the coolant. The internal drive gear is received by the gear driven mechanism and is coupled to the actuator. A torque produced by the actuator is transmitted to the internal drive gear for rotating the rotary disc.

In another aspect of the invention, the multi-port rotary valve of further comprises a spring located about an axis between the rotary disc and said inlet housing. The spring includes a first end and a second end for placing the spring into a loaded state when the actuator transmits the torque to the external drive gear for rotating the rotary disc. The rotary disc includes a latch radially positioned at a first distance between the first end and the second end of the spring for circumferentially displacing one of the ends when in the loaded state. The inlet housing includes a stop radially positioned at a second distance between the first end and the second end for maintaining a fixed position of one of the ends when in the loaded state. The rotary disc includes a failsafe position when the spring is in a preloaded state. The rotary disc is rotatable clockwise and counterclockwise from the failsafe position when the actuator is energized and the spring overcomes said torque of the actuator when the actuator is de-energized to return to the failsafe position.

DETAILED DESCRIPTION OF PREFERRED EMBODIMENTS

Figure 1A:
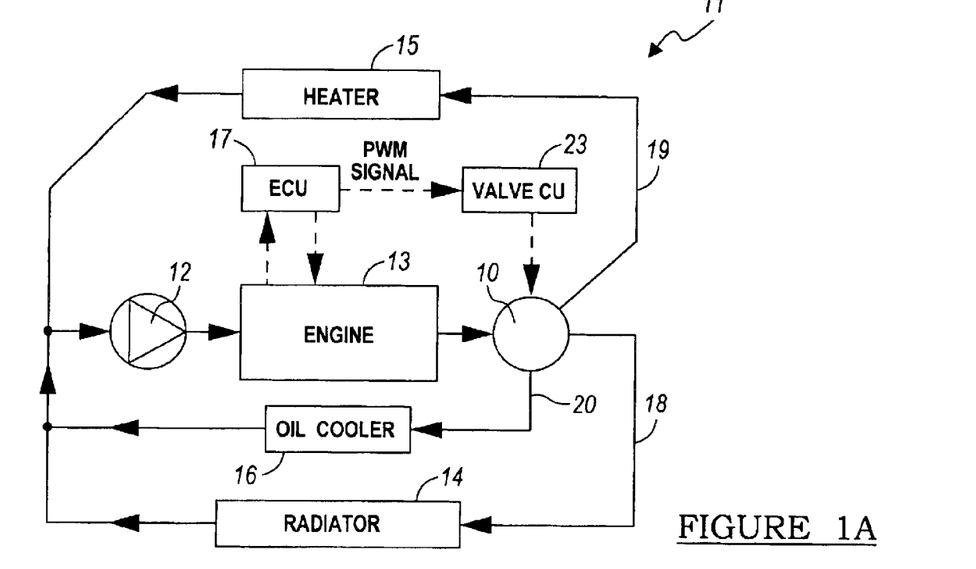
FIG. 1a is a block diagram of an engine cooling system illustrating a multi-port rotary valve for a diesel application.
Figure 1B:
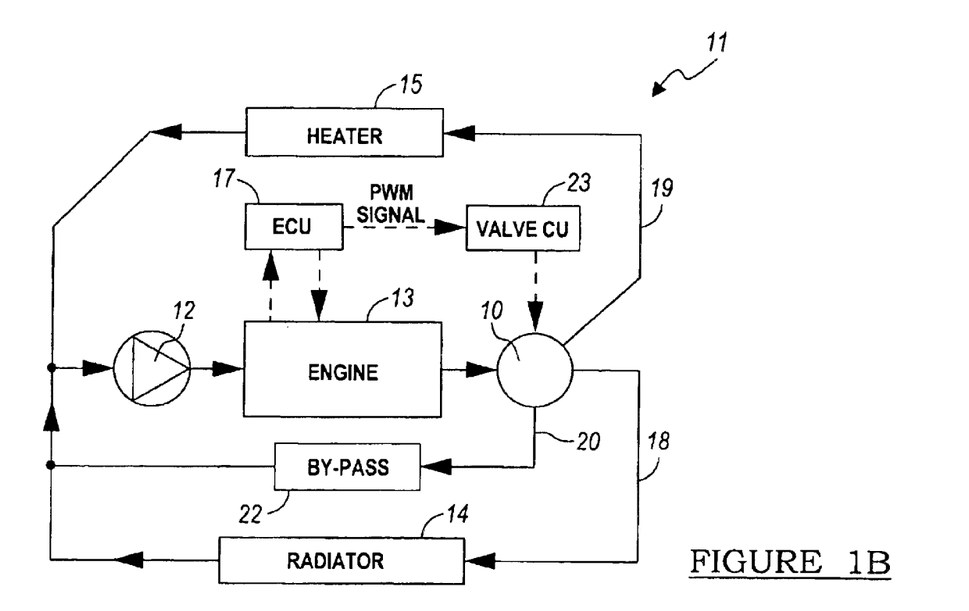
FIG. 1b is a block diagram of an engine cooling system illustrating the multi-port rotary valve for a gasoline application.

Referring now to the Drawings and particularly to FIG. 1a, there is shown an engine cooling system 11 incorporating a multi-port rotary valve 10 for a diesel engine. The cooling system 11 includes a water pump 12, an engine 13 with a water jacket for receiving coolant flow, a radiator 14, a heater core 15, oil-cooler 16, an engine control unit (ECU) 17 or a PCM (also known as a powertrain control module), and a valve control unit 23 (e.g. electronic actuator such as a motor). The water pump 12 forces the coolant flow through the engine 13 to the rotary valve 10. The rotary valve 10 directs the coolant flow received from the engine 13 in selectable proportions or flow rates to a radiator circuit 18 which includes the radiator 14 for cooling the coolant flow received by the engine 13, a heater circuit 19 for delivering coolant in a heated state to a heater circuit which includes the heater core 15 for heating a passenger compartment of a vehicle, an auxiliary circuit 20 which in a diesel application includes an oil-cooler circuit for directing the coolant flow to the oil-cooler 16. The rotary valve 10 receives all of its coolant flow from the engine 13 and directs the coolant flow path and flow rates to the plurality of circuits either individually or in combination. However, other overall system configurations are also possible as shown in FIG. 1b which shows an engine cooling system utilizing the rotary valve 10 for the gasoline engine. In this embodiment, the auxiliary circuit 20 includes a bypass circuit 22. The bypass circuit 22 bypasses coolant away from other components, such as the radiator, so as to supply the coolant directly back to the water pump 12. The ECU 17 monitors engine conditions such as engine operating temperature and provides a control signal (e.g. PWM signal) to the valve control unit 23 for regulating valve positioning. Additional cooling system components such as a de-gas circuit to a coolant reservoir or circuits to other auxiliary heat exchangers can be accommodated by additional ports on rotary valve 10.

Figures 2A, 2B:
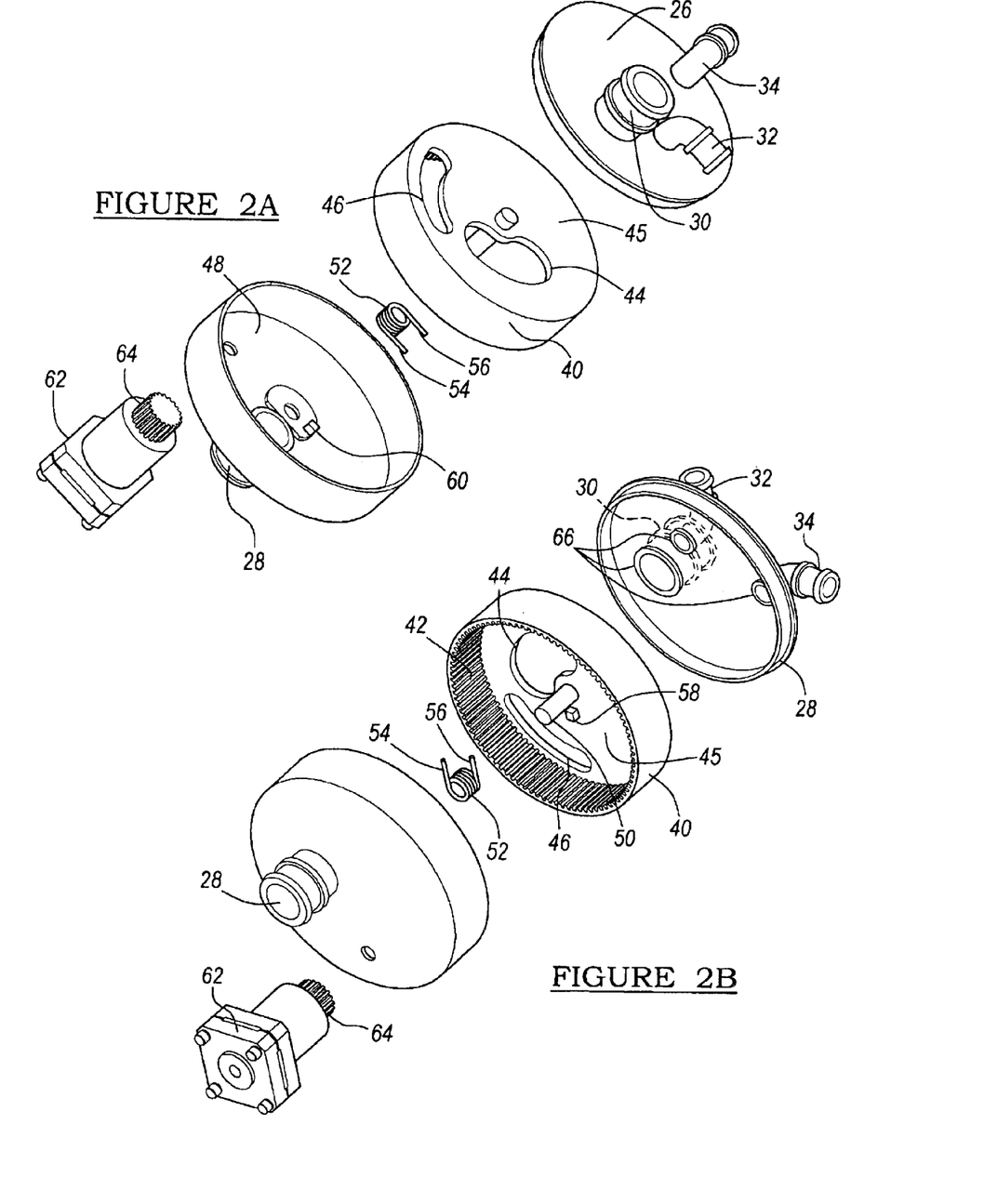
FIG. 2a is an exploded, top perspective view of the multi-port rotary valve illustrating the internal components.
FIG. 2b is an exploded, bottom perspective view of the multi-port rotary valve illustrating the internal components.

FIG. 2a illustrates a first embodiment of the rotary valve 10 comprising a valve body 26 The valve body 26 comprises at least three outlet ports in the preferred embodiment. The outlet ports include a radiator port 30, a heater port 32, and an auxiliary port 34. The auxiliary port 34 may either be an oil-cooler port as in the diesel application or a bypass port as in the gasoline application. The valve body 26 is cylindrical shaped and the outlet ports are positioned on the top surface of the valve body 26. The radiator port 30 and the heater port 32 are positioned at a first radius on the valve body 26 whereas the auxiliary port 34 is positioned at a second radius on the valve body 26. An internal gear driven rotary disc 40 is positioned below the valve body 26. A gear driven mechanism 42 (shown in FIG. 2b) is located about an entire inner circumference and on the underside of the rotary disc 40 and integrally molded with the rotary disc 40, although the gear driven mechanism 42 may also be a separate piece affixed to the disc. Alternatively, the gear driven mechanism 42 located on the inner circumference may extend only a portion of the inner circumference that is required to achieve coolant flow required by each of the respective ports as opposed being located about the entire inner circumference. Two apertures 44 and 46 functioning as flow diverters are formed at respective radial positions in an end plate of the rotary disc 40. The apertures are radially offset from one another. The radius of the first aperture 44 corresponds to the placement of the radiator port 30 and the heater port 32 on the valve body 26. The radius of the second aperture 46 corresponds to the placement of the auxiliary port 34 on the valve body 26. The first aperture 44 regulates the flow rates of both the radiator port 30 and the heater port 32 while the second aperture 46 regulates the flow rate of the auxiliary port 34 in dependence of the rotational position of disc 40. In the preferred embodiment, both the first aperture 44 and the second aperture 46 are kidney shaped. However, alternative shapes may be utilized. The circumferential length of the first and second aperture 44, 46 are determined by the cooling system characteristics and requirements. The rotary disc 40 further includes a shaft 50 located about its center axis. An inlet housing body 48 which encases the rotary disc 40 along with the valve body 26 includes the inlet port 28 located on the bottom surface of the inlet housing body 48 for receiving coolant flow from the engine 13. Both the valve body 26 and the inlet housing body 48 includes a center aperture for receiving the shaft 50. The inlet port 28 and the radiator port 30 are co-axially aligned with one another, and as a result, the main flow of coolant is non-diverted resulting in a smaller pressure drop when the coolant flow is sent to the radiator versus the resultant pressure drop when the coolant flow is sent to the radiator using a traditional engine thermostat system. Alternatively, the shaft 50 may be off center or the disc may be free floating without the use of a shaft but bound by a housing body and gearing.

A coiled spring 52 is positioned on the shaft 50 between the rotary disc 40 and the inlet housing body 48. The spring 52 includes a first end 54 and a second end 56 for placing the spring 52 into a loaded state when a torque is applied to it. The rotary disc 40 includes a latch 58 radially positioned at a first distance between the first end 54 and the second end 56 for circumferentially displacing one of the ends when the spring 52 is in a loaded state. The inlet housing body 48 includes a stop 60 (shown in FIGS. 2a and 3) radially positioned at a second distance offset from the latch 58 between the first end 54 and the second end 56 for maintaining a fixed position of one of the ends when in the loaded state. When the latch 58 and the stop 60 are radially inline with one another, the spring 52 is in a preloaded state and the rotary disc 40 is at a failsafe position. The failsafe position is a default position wherein the alignment of rotor disc 40 and the valve body 26 provides maximum engine cooling and passenger compartment heating should a failure of the actuator 62 occur.

An actuator 62 located external to the inlet housing body 48 includes a driver unit for creating a torque to drive the rotary disc 40. The drive unit may receive the control signal from the valve control unit 23 or the valve control unit 23 may be incorporated into the drive unit wherein the drive unit receives the control signal directly from the ECU 17. The drive unit may be comprised of an electric motor (e.g. stepper motor) which receives a control signal such as an analog or digital command signal representative of a desired angular position of the rotary disc 40. The drive unit could also be hydraulically or pneumatically driven with corresponding hydraulic or pneumatic inputs. A drive gear 64 is coupled to the actuator 62 by a drive unit shaft and is located interior to the inlet housing body 48. The drive gear 64 is received by the gear driven mechanism 42 and rotates the rotary disc 40 either clockwise or counterclockwise to the desired angular position when a torque from the actuator 62 is applied to the drive gear 64.

In the event of failure of the actuator 62, (e.g. loss of power) or loss of control signal while the rotary disc 40 is out of the failsafe position, potential energy of the spring 52 generated from the displacement of the spring 52 from its failsafe position can overcome the torque of the actuator 62 when the actuator 62 is de-energized so as to return the rotary disc 40 to the failsafe position. The torque required of the actuator 62 to return the rotary disc 40 to its failsafe position must be higher then the instantaneous friction torque (e.g., torque due to the friction between the rotary disk and sealing elements) plus the motor detent torque (e.g., actuator de-energized). Since the failsafe position is at the rotational midpoint of the rotary disc 40, a smaller angle of rotation is required to return the rotary disc 40 to the failsafe position as opposed to a failsafe position being at a distal end of the rotary disc 40, and as a result, the spring 52 can be designed with a lower torsion spring torque. When the spring 52 is at the failsafe position, it is to be understood that the spring 52 is preloaded to position the first end 54 and the second end 56 of the spring 52 between the latch 58 and the stop 60. This preloaded condition is an initial load exerted on the spring during the assembly process when the ends of the spring 52 are disposed between the latch 58 and the stop 60 to urge rotary disc 40 into the failsafe postion. At the failsafe position, first aperture 44 is positioned such that that maximum coolant flows from the inlet port 28 to the radiator port 30. Although engine warm-up may not be optimized, this direct and maximum flow at the failsafe position ensures that the engine 13 is protected from overheating and flow to the heater core 15 ensures that the passenger compartment heating is available for warming or defrosting functions if required.

FIG. 2b illustrates an exploded, perspective bottom view of the multi-port rotary valve 10. To reduce the axial hydraulic force on the rotary disk, a plurality of protruding collars 66 are incorporated around the radiator port 30, the heater port 32, and the auxiliary port 34 for contacting the outlet-side surface of the rotary disc. The inlet-side surface of the rotary disc 40 is always subjected to high pressure. The plurality of collars 66 allow for a majority of the outlet-side surface of the rotary disc 40 to be exposed to high pressure so as to net out the pressure distribution on each side of the rotary disc 40. For example, depending on the angular position of the rotary disc 40, some limited surface areas of the outlet-side surface will be exposed to lower pressures. Surface areas facing the radiator port 30 are exposed to a low pressure when the radiator port 30 is closed. Surface areas facing the heater port 32 and the auxiliary port 34 are exposed to a medium pressure when both of the ports are partially open. At this stage, there is a strong local sealing pressure against the closed radiator port 30 and there is a mild sealing pressure force against the partially open heater port 32 and auxiliary port 34. As the ports open more, the outlet-side pressure grows closer to the inlet-side pressure, and as a result, the net sealing force (difference between the inlet-side port and the outlet-side ports) decreases and the resulting leakage becomes less important. When the ports are closed or substantially closed, the rotary disc 40 experiences the full sealing force and the smallest leakage. Without the plurality of collars 66, the majority of the inlet-side surface of the disk would be exposed to the lower pressure, resulting in a much larger axial force on the rotary disc 40 including a larger frictional force, which would require a need for a larger actuator to rotate the rotary disc 40. Incorporating protruding collars to the valve ports can be achieved by many different methods. Protruding collars can be molded as an integral part of a structure using the same material, or as an insert using different material.

Figures 3, 4, 5:
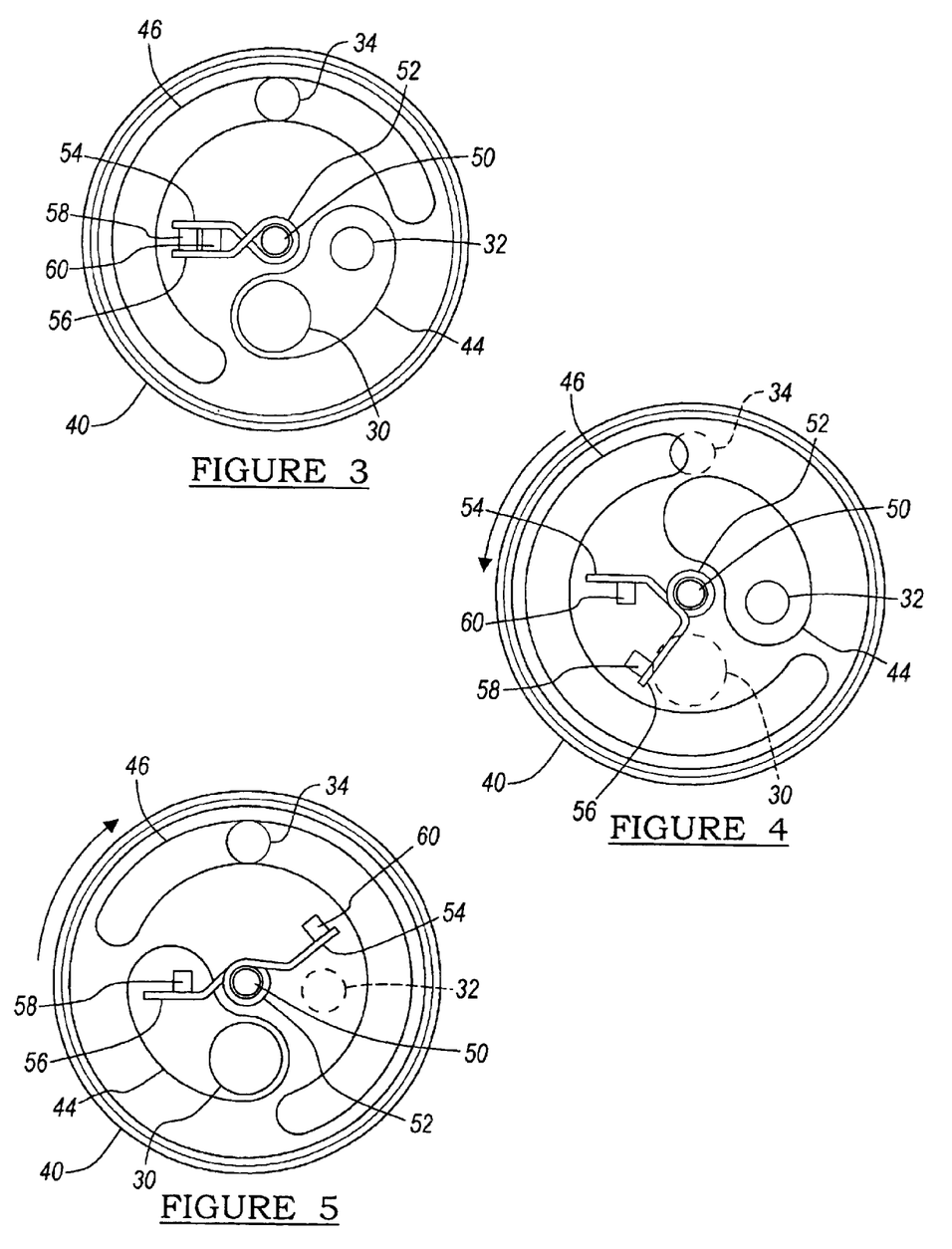
FIG. 3 is a bottom view of the rotary valve illustrating a failsafe position.
FIG. 4 is a bottom view of the rotary valve illustrating the rotary valve operating in a counter-clockwise direction.
FIG. 5 is a bottom view of the rotary valve illustrating the rotary valve operating in a clockwise direction.

FIG. 3 illustrates the rotary disc 40 in the default or failsafe position. The spring 52 is in the preloaded state at the rotational midpoint on the rotary disc 40. At the failsafe position, the first aperture 44 overlaps the radiator port 30 and the heater port 32 so that full coolant flow is directed to the radiator circuit 18 and the heater circuit 19. The second aperture 46 overlaps the auxiliary port 34 so that full coolant flow is directed to the auxiliary circuit 20. FIG. 4 shows the rotary disc 40 rotated in a counter-clockwise position. The first end 54 maintains the fixed position as a result of the stop 60 while the latch 58 forces the second end 56 to be rotated thereby placing a load on the spring 52. In this position, the first aperture 44 overlaps only the heater port 32. Coolant is directed only to the heater circuit 19 while the radiator port 30 is sealed. The second aperture 46 partially overlaps the auxiliary port 34, thereby regulating the flow rate directed to the auxiliary circuit 20. The spring 52 is in a loaded state and in the event of a failure of the actuator 62, the spring 52 will return the rotary disc 40 to the failsafe position as depicted in FIG. 4. FIG. 5 illustrates the rotary disc 40 rotated in the clockwise position. The position of the second end 56 is maintained by the stop 60 while the latch 58 forces the second end 56 to be rotated to the loaded state. The first aperture 44 overlaps the radiator port 30 while the heater port 32 is sealed. Maximum coolant flow is directed to the radiator circuit 18. The second aperture 46 fully overlaps the auxiliary port 34 and maximum coolant flow is directed to the auxiliary circuit 20. By virtue of FIGS. 3, 4, and 5, it is illustrated that the rotary disc 40 needs only to rotate a small rotational distance from the failsafe position to regulate the radiator port 30 or the heater port 32. As a result, less time is required to regulate coolant flow between the radiator port 30 and the heater port 32 because of the short distance rotated.

Figure 6A:
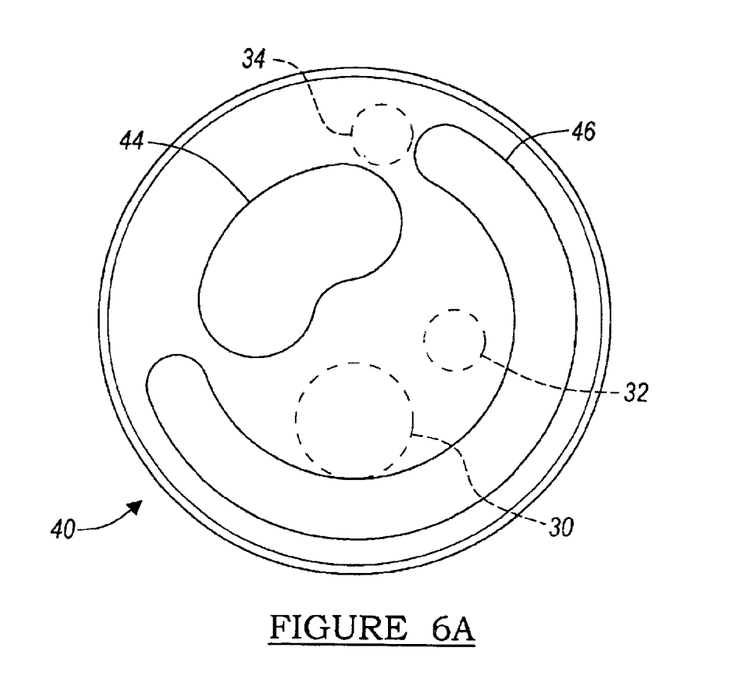
FIG. 6a is a bottom view of a rotary disc showing apertures for a diesel application according to a first embodiment.
Figure 6B:
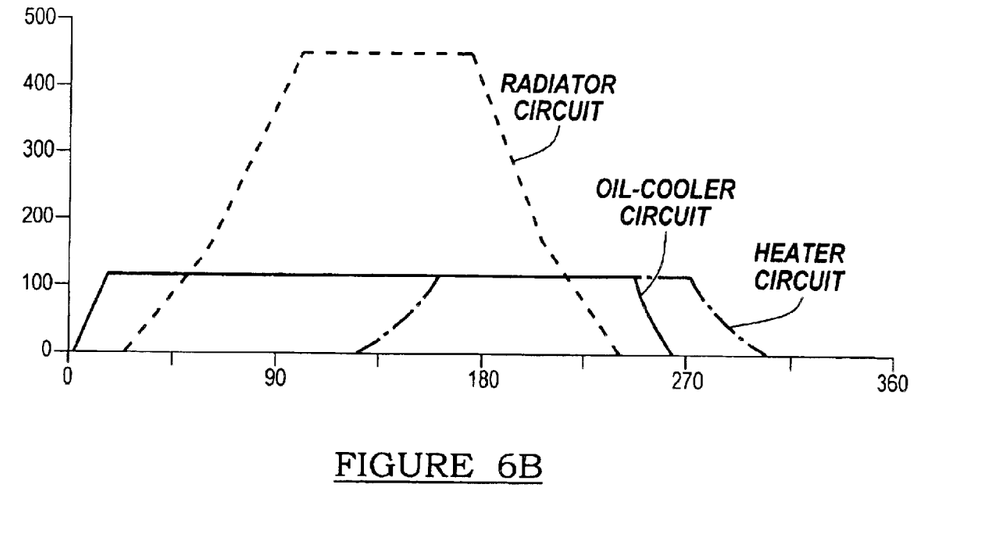
FIG. 6b is a graph showing opening and closing characteristics for the first embodiment.

FIG. 6a illustrates a top view of the rotary disc 40 for a diesel application according to a first embodiment. The first aperture 44 is at a first radius on the rotary disc 40 while the second aperture 46 is at a second radius. The flow control is determined by the circumferential length and overlap of the apertures to their respective ports. FIG. 6b shows flow rates for the rotary disc 40 depicted in FIG. 6a.

In this embodiment, the diesel application is used and the auxiliary port 34 functions as the oil-cooler port. A large circumferential length is incorporated in the second aperture 46 to maintain oil cooling for a majority of the time the vehicle is operating.

Figure 7A:
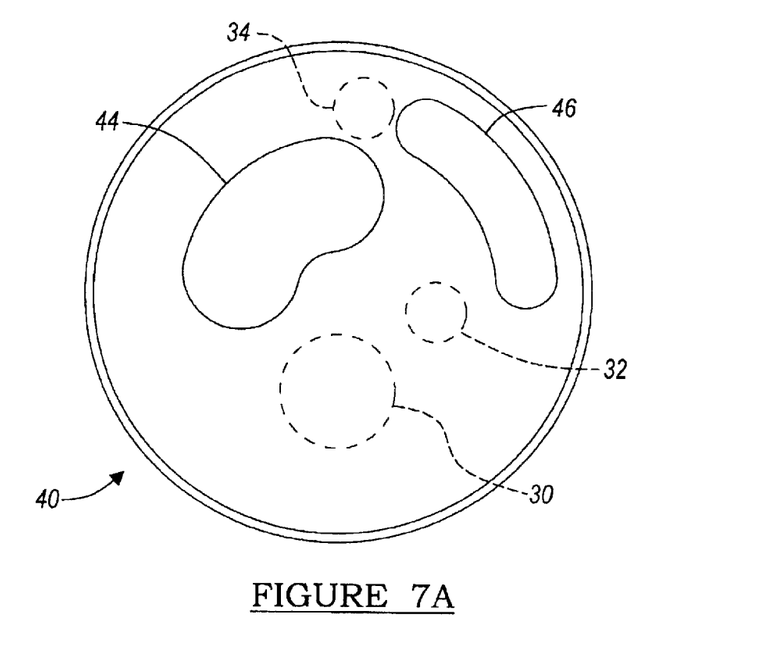
FIG. 7a is a bottom view of a rotary disc showing apertures for a gasoline application according to a second embodiment.
Figure 7B:
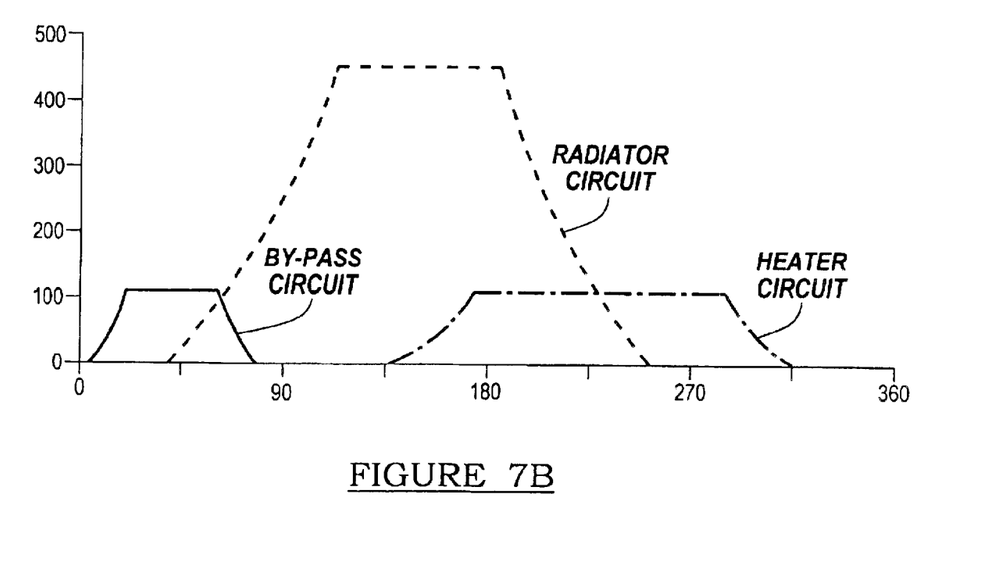
FIG. 7b is a graph showing opening and closing characteristics for a gasoline application according to a second embodiment.

FIG. 7a illustrates a top view of the rotary disc 40 of a gasoline application according to a second embodiment. In this the auxiliary port 34 functions as the bypass port. A small circumferential length is incorporated in the second aperture 46 because the engine 13 needs non-cooled coolant only during a short interval while the vehicle is operating such as when a vehicle is initially started and it is desirable to bring engine temperatures quickly up to a desired operating temperature range. FIG. 7b shows flow rates for the rotary disc 40 as shown in FIG. 7a.

As a result of the forgoing interactions between the rotary disc and the ports, the rotary valve is able to adapt to diesel or gasoline applications with just minor modification to the circumferential length and positioning of the apertures. The same radius for each of the ports for both diesel and gasoline applications may be applied. Various engine sizes and cooling systems can be accommodated by making minor and low cost modifications to the circumferential length and position of the apertures of the rotary disc. As a result, common parts and common manufacturing processes may be used to manufacture and implement the present invention.

Furthermore, utilizing an internal drive gear mechanism reduces the amount of space required to package the gear drive and the gear driven mechanism. By incorporating a direct gear drive interconnection within an internal chamber of the multi-port rotary valve, packaging space exterior to the multi-port rotary valve is conserved. The internal direct gear drive interconnection simplifies the design by reducing the number of components, and as a result, increases the ease of manufacturing. Furthermore, with the incorporation of a failsafe mechanism within the multi-port rotary valve, added external packaging space is not required as opposed to rotary valves with external clutch mechanisms or actuators with internal clutch mechanisms.

What is claimed is:

1. A multi-port rotary valve for distributing coolant to an engine cooling system comprising:
   a valve body having a plurality of outlet ports including a radiator port for directing coolant flow to a radiator circuit, a heater port for directing coolant flow to a heater circuit, said plurality of ports are located on a top surface of said valve body;
   an internal gear driven rotary disc including a gear driven mechanism located on an inner circumference of said rotary disc, wherein said rotary disc includes at least one aperture positioned on a top surface of said rotary disc for regulating predetermined flow paths and flow rates to said plurality of ports;
   an actuator responsive to a control signal for rotating said rotary disc to regulate said coolant flow to said plurality of ports;
   an inlet housing body mating with said valve body to encase said rotary disc, said inlet housing body including an inlet port; and
   a drive gear mounted internal to said inlet housing body residing in said coolant, said internal drive gear being received by said gear driven mechanism and coupled to said actuator, wherein a torque produced by said actuator is transmitted to said internal drive gear for rotating said rotary disc.

2. A multi-port rotary valve for distributing coolant to an engine cooling system comprising:
   a valve body having a plurality of outlet ports including a radiator port for directing coolant flow to a radiator circuit, a heater port for directing coolant flow to a heater circuit, said plurality of ports are located on a top surface of said valve body;
   a rotary gear driven disc including two apertures positioned on a top surface of said rotary disc for regulating predetermined flow paths and flow rates to said plurality of ports, and wherein a first aperture regulates jointly said radiator port and said heater port, and a second aperture regulates said auxiliary port;
   an actuator responsive to a control signal for rotating said rotary disc to regulate said coolant flow to said plurality of ports;
   an inlet housing body mating with said valve body to encase said rotary disc, said inlet housing body including an inlet port;
   a spring coupled to said rotary disc for urging the rotary disc to a failsafe position; and
   wherein said rotary disc is rotatable clockwise and counterclockwise from said failsafe position when said actuator is energized, wherein said spring overcomes said torque of said actuator to return to said failsafe position when said actuator is de-energized.

3. A multi-port rotary valve for distributing coolant to an engine cooling system comprising:
   a valve body having a plurality of outlet ports including a radiator port for directing coolant flow to a radiator circuit, a heater port for directing coolant flow to a heater circuit, an auxiliary port for directing coolant flow to an auxiliary circuit, said plurality of ports are located on a top surface of said valve body;
   an internal gear driven rotary disc including a gear driven mechanism located on an inner circumference of said rotary disc, wherein said rotary disc includes two apertures positioned on a top surface of said rotary disc for regulating predetermined flow paths and flow rates to said plurality of ports, and wherein a first aperture regulates jointly said radiator port and said heater port, and a second aperture regulates said auxiliary port;
   an actuator responsive to a control signal for rotating said rotary disc to regulate said coolant flow to said plurality of ports;
   an inlet housing body mating with said valve body to encase said rotary disc, said inlet housing body including an inlet port; and
   a drive gear mounted internal to said inlet housing body residing in said coolant, said internal drive gear being received by said gear driven mechanism and coupled to said actuator, wherein a torque produced by said actuator is transmitted to said internal drive gear for rotating said rotary disc.

4. The multi-port rotary valve of claim 3 further comprising a spring located about an axis between said rotary disc and said inlet housing;
   said spring includes a first end and a second end for placing said spring into a loaded state when said actuator transmits said torque to said external drive gear for rotating said rotary disc;

said rotary disc includes a latch radially positioned at a first distance between said first end and said second end of said spring for circumferentially displacing one of said ends when in said loaded state;

said inlet housing includes a stop radially positioned at a second distance between said first end and said second end for maintaining a fixed position of one of said ends when in said loaded state, said rotary disc includes a failsafe position when said spring is in a preloaded state; and wherein said rotary disc is rotatable clockwise and counterclockwise from said failsafe position when said actuator is energized, wherein said spring overcomes said torque of said actuator to return to said failsafe position when said actuator is de-energized.

5. The multi-port rotary valve of claim 3 wherein said first and second aperture are radially offset said rotary disc.

6. The multi-port rotary valve of claim 5 wherein said radiator port and said heater port are positioned at a first radius on said valve body.

7. The multi-port rotary valve of claim 6 wherein said auxiliary port is positioned at a second radius on said valve body.

8. The multi-port rotary valve of claim 6 wherein said inlet port is positioned at said first radius on said inlet housing.

9. The multi-port rotary valve of claim 3 wherein said actuator includes an electric motor.

10. The multi-port rotary valve of claim 9 wherein said electric motor includes a stepper motor.

11. The multi-port rotary valve of claim 3 wherein said auxiliary port comprises an oil cooler-port for supplying coolant to an oil-cooler circuit.

12. The multi-pot rotary valve of claim 3 wherein said auxiliary port comprises a bypass port for supplying coolant to a bypass circuit.

13. The multi-port rotary valve of claim 3 wherein said plurality of ports include protruding collars on an underside of said valve body, said protruding collars provide an adaptive hydraulic sealing force between said plurality of ports and said rotary disc.

14. A multi-port rotary valve for distributing coolant to an engine cooling system comprising:

a valve body having a plurality of outlet ports including a radiator port for directing coolant flow to a radiator circuit, a heater port for directing coolant flow to a heater circuit, an auxiliary port for directing coolant flow to an auxiliary circuit, said plurality of ports are located on a top surface of said valve body;

a rotary gear driven disc including two apertures positioned on a top surface of said rotary disc for regulating predetermined flow paths and flow rates to said plurality of ports, and wherein a first aperture regulates jointly said radiator port and said heater port, and a second aperture regulates said auxiliary port;

an actuator responsive to a control signal for rotating said rotary disc to regulate said coolant flow to said plurality of ports;

an inlet housing body mating with said valve body to encase said rotary disc, said inlet housing body including an inlet port;

a spring coupled to said rotary disc for urging the rotary disc to a failsafe position; and wherein said rotary disc is rotatable clockwise and counterclockwise from said failsafe position when said actuator is energized, wherein said spring overcomes said torque of said actuator to return to said failsafe position when said actuator is de-energized.

15. The multi-port rotary valve of claim 14 wherein said spring is located about an axis between said rotary disc and said inlet housing, said spring includes a first end and a second end for placing said spring into a loaded state when said actuator transmits torque to said rotary disc for rotating said rotary disc, wherein said rotary disc includes a latch radially positioned at a first distance between said first end and said second end of said spring for circumferentially displacing one of said ends when in said loaded state, and wherein said inlet housing includes a stop radially positioned at a second distance between said first end and said second end for maintaining a fixed position of one of said ends when in said loaded state.

16. The multi-port rotary valve of claim 14 further comprising a drive gear mounted internal to said inlet housing body residing in said coolant, said rotary gear driven disc including a gear driven mechanism located on an inner circumference of said rotary disc, wherein said internal drive gear is received by said gear driven mechanism and coupled to said actuator, and wherein a torque produced by said actuator is transmitted to said internal drive gear for rotating said rotary disc.

17. The multi-port rotary valve of claim 14 wherein said first and second aperture are radially offset said rotary disc.

18. The multi-port rotary valve of claim 14 wherein said radiator port and said heater port are positioned at a first radius on said valve body.

19. The multi-port rotary valve of claim 18 wherein said auxiliary port is positioned at a second radius on said valve body.

20. The multi-port rotary valve of claim 18 wherein said inlet port is positioned at said first radius on said inlet housing.

21. An engine cooling and heating system for a vehicle comprising:

a pump for circulating a coolant;

an engine including an engine coolant circuit;

a radiator circuit for directing coolant flow through a radiator;

a heater circuit for directing coolant flow through a heater core;

an auxiliary circuit for directing coolant flow to said auxiliary circuit;

a valve body having a plurality of outlet ports including a radiator port for directing coolant flow to said radiator circuit, a heater port for directing coolant flow to said heater circuit, an auxiliary port for directing coolant flow to said auxiliary circuit, said plurality of ports located on a top surface of said valve body;

an internal gear driven rotary disc including a gear driven mechanism located on an inner circumference of said rotary disc, wherein said rotary disc includes two apertures positioned on a top surface of said rotary disc for regulating predetermined flow paths and flow rates to said plurality of ports, and wherein a first aperture regulates jointly said radiator port and said heater port, and a second aperture regulates said auxiliary port;

an actuator responsive to a control signal for rotating said rotary disc to regulate said coolant flow to said plurality of ports;

an inlet housing body mating with said valve body to encase said rotary disc, said rotary disc including an inlet port;

a controller for providing a control signal to said actuator for regulating a rotational position of said rotary disc;

a drive gear mounted internal to said inlet housing body residing in said coolant, said internal drive gear being received by said gear driven mechanism and coupled to said actuator, wherein a torque produced by said actuator is transmitted to said internal drive gear for rotating said rotary disc;

wherein said predetermined flow paths include a plurality of modes for distributing coolant flow wherein at least one mode includes a failsafe position if said actuator is unresponsive to said control signal, said multi-port rotary valve includes a mechanism for returning said rotary disc to said failsafe position; and wherein said flow rate to a respective outlet port is regulated by at least one of said modes for distributing coolant flow, wherein said at least one of said modes includes an overlap condition of at least one of said apertures and said outlet ports, and wherein said flow rate of said respective outlet ports is proportional to an amount of overlap between said at least one of said apertures and said outlet ports.

22. The multi-port rotary valve of claim 21 wherein said failsafe position is a default position located at a rotational midpoint on said rotary disc, said rotary disc is rotatable clockwise and counterclockwise from said failsafe position.

23. The multi-port rotary valve of claim 21 wherein said auxiliary port includes an oil cooling port and said auxiliary circuit includes an oil cooling circuit.

24. The multi-port rotary valve of claim 21 wherein said auxiliary port includes an bypass port and said auxiliary circuit includes an bypass circuit, wherein said bypass circuit is directly connected to said engine cooling circuit.

25. The multi-port rotary valve of claim 21 wherein said first and second aperture are radially offset on said rotary disc.

* * * * *